June 14, 1966  W. L. RILEY  3,255,549
CASTABLE FISHING FLOAT
Filed March 9, 1964
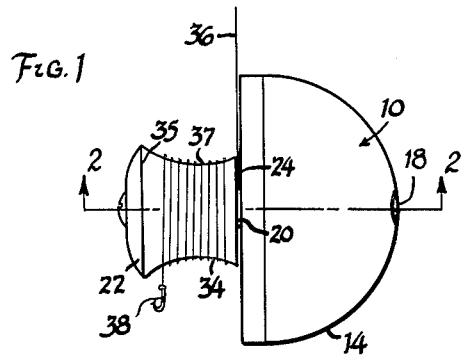
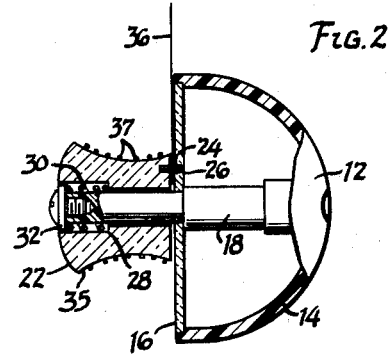
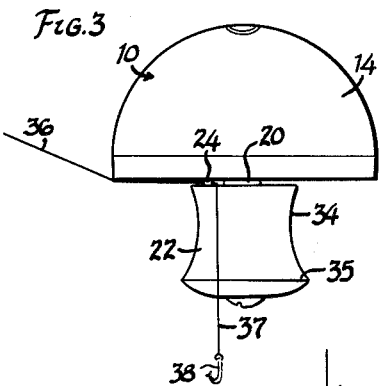
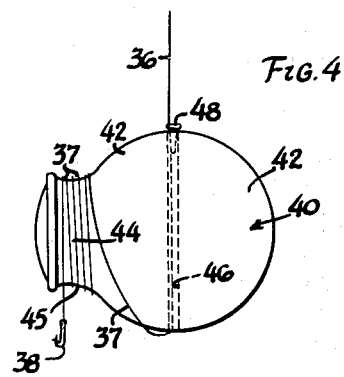
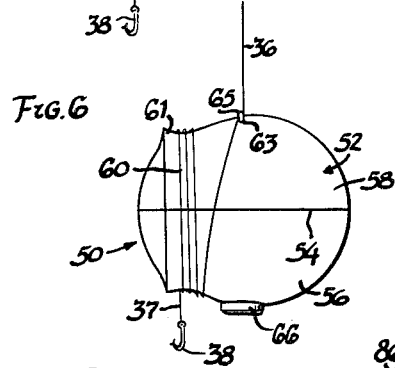
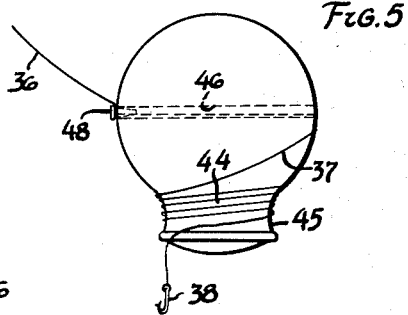
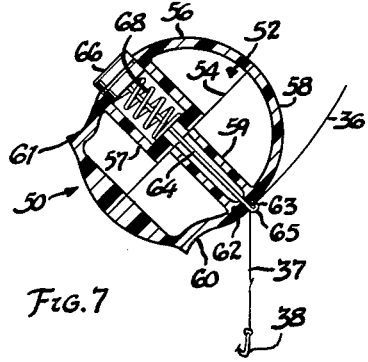
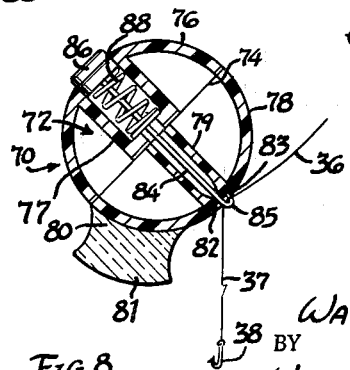
INVENTOR.
WAYNE L. RILEY
BY
WILSON, SETTLE & CRAIG
ATTORNEYS United States Patent Office 3,255,549
Patented June 14, 1966

3,255,549
CASTABLE FISHING FLOAT
Wayne L. Riley, 529 Rosewood Ave. SE.,
Grand Rapids 6, Mich.
Filed Mar. 9, 1964, Ser. No. 350,221
2 Claims. (Cl. 43—43.11)

This invention relates to an improved fishing float or bobber of the type adapted to store a hook attached length of fishing line during casting and to release the stored length of fishing line after water entry, thereby permitting the fishing hook to descend to a desired fishing depth.

Castable floats or bobbers of the type indicated permit a sinker, leader, and baited hook to be cast accurately as a compact unit with a stored, float attached line without snarling or tangling. Such prior art devices, however, have generally required the stored line to be positively caught or retained in some manner during the casting process and released subsequent to the water strike completing a cast either by relative movement between several elements of the float device or by suitable line disengaging manipulation of the float with no assurance that the stored line would in fact be released.

This invention broadly contemplates a castable float of simple, inexpensive, trouble-free, compact construction easily used with any normal size fishing line and assuring release of the stored fishing line and descent of a baited hook to desired fishing depth as soon as the float enters the water.

The invention further contemplates and in several illustrative fishing floats herein disclosed provides a buoyant float portion or member with a line retaining spool or cylindrical portion of greater density having a common axis therewith. Means are provided for adjustably securing the fishing line to the float at a point normal to the spool axis and lying in a plane passing substantially through the center of gravity of the combined float and spool unit. The hook attached section of line may thus be adjusted to desired fishing depth and wound on the line storing spool which is balanced and maintained normal to the rod attached line in a substantially horizontal axial position when the float is suspended from the fishing rod prior to casting. During a subsequent cast, centrifugal forces maintain the common axis of the float and spool portions substantially normal, i.e., perpendicular, to the attached casting line. Similar centrifugal forces act on the baited hook and serve to retain the stored line portion on the spool or float through the arc of the cast.

The buoyancy differentials provided between the float and spool portions of the illustrative floats cause each spool portion to assume a depending submerged position on a vertical axis upon water entry of its respective float. The fish line carried by the spool portion during the cast is thus permitted to unwind or peel freely from the spool with consequential descent of the baited hook with or without a sinker to the desired fishing depth.

The foregoing and other objects, advantages and features of the invention will be apparent from the following description of the several illustrative embodiments, having reference to the accompanying drawing, in which:

FIGURE 1 is a side elevational view of a float illustrative of the invention and is shown suspended from a fishing rod in a position ready for casting;

FIGURE 2 is a sectional view, partly in elevation, taken substantially in the plane of the line indicated at 2—2 of FIGURE 1;

FIGURE 3 is a side elevational view showing the float of FIGURES 1 and 2 in its normal floating position with the hook and the hook attached length of line previously stored thereon unwound to the desired fishing depth;

FIGURE 4 is a side elevational view of a second float incorporating the invention, and shown in a suspended position prior to casting with the hook attached length of fishing line wound on an attached spool or collar;

FIGURE 5 is a similar view showing the initial in-water, floating position of the float of FIGURE 4 with the stored line portion starting to unwind thus lowering the attached hook toward the desired fishing depth;

FIGURE 6 is a side elevational view illustrative of a third form of the invention prior to casting with the hook attached length of fish line wound thereon;

FIGURE 7 is a transverse sectional view illustrating the internal construction and the normal floating position of the float of FIGURE 6 with the unwound fishing line and hook descended to the desired fishing depth; and FIGURE 8 is a sectional view similar to FIGURE 7 showing a commercially available fishing float modified in accordance with the invention.

Referring more particularly to FIGURES 1–3, a castable fishing float incorporating the principle of the invention is indicated generally by the reference numeral 10 and includes a hollow, buoyant float portion 12 comprising a hemispherical member such as a plastic cup 14 closed at its open end by a centrally perforated plate 16. An integral or separately formed plastic rod 18 extends coaxially between the members 14 and 16 as shown and has an end portion 20 projecting outwardly of the plate 16.

As best seen in FIGURE 2, a spool 22 is slidably mounted on the projecting portion of the rod. This spool is normally restrained from rotation relative to the float portion 12 by one or more detenting bosses or pins 24 carried by either the plate or spool as shown and engageable with cooperating holes or notches 26 provided in the opposite member. The spool is normally biased toward such detenting engagement by a spring 30 compressively interposed between a spring seating washer 32 secured to the projecting end of the rod 18 and a shoulder formed by a counterbore 28 in the spool. The outer surface 34 of the spool 22 is generated by revolution of a line of smooth, concave curvature extending intermediate the ends of the spool. In the illustrative embodiment, the line of generation is slightly inclined so as to terminate in a line retaining end flange 35 of maximum diameter remotely of the hemispherical float portion 12.

A fishing line 36 supported and suspended from a fishing rod in the usual manner is threaded between the float end plate 16, the spool 22, the rod 18 and at least one of the spool detenting pins or bosses 24. The fishing line is thus clamped between the float and spool to provide an adjustable end length of line 37 corresponding to the desired fishing depth. A suitable fishing hook 38 is secured to the end of the adjusted line portion 37 distal from its adjustable attachment to the float.

The relatively dense spool, its supporting rod 20 and biasing spring 30 tend to balance the mass of the buoyant hemispherical float portion about the point of line attachment provided between the spool and hollow float portions. In other words, the point of line attachment from the casting rod lies in a plane normal to the common float and spool axis and passes substantially through the center of gravity of the combined float and spool. The float suspending line 36 thus tends to maintain the axis of the spool 22 substantially horizontal prior to a casting throw. This normal horizontal disposition of the spool axis permits the hook attached line portion 37 to be wound and carried on the spool prior to casting. Through the arc of a subsequent casting throw, this wound line portion is retained on the spool by centrifugal forces, tending to maintain the spool axis normal to the casting line and acting on the hook attached to the end of this spool wound line portion. During casting, engagement between the circular end surface 16 of the float portion 12 and the casting line 36 may also tend to stabilize the in-air arcuate flight of the combined float and thus provide greater spot casting accuracy.

When the combined float 10 strikes the water upon completion of a cast, the buoyant float portion 12 assumes a floating position substantially above the water. As shown in FIGURE 3, this floating position submerges the relatively denser spool portion on a substantially vertical axis. This submerged position of the spool permits the fishing line and the attached hook stored thereon during the casting throw to spin or unwind freely and assures consequential descent of the hook to the desired fishing depth.

Such float casting and hook descent is thus accomplished without whiplash and potential line entanglement, without undue commotion during or after water entry upon completion of the cast, and minimizes hook and line entanglements with submerged weeds and snags.

The form of the invention shown in FIGURES 4 and 5 is of simpler, essentially one-piece construction. In this construction, the castable float 40 includes an oblate or substantially spherical float portion or member 42 of suitable buoyant material such as cork or hollow plastic. A weighted knob portion or spool member 44 of concave outer curvature 45, similar to the previous embodiment, may be formed integrally or suitably secured to the buoyant spherical portion or float member on an axis normally bisecting a hole or bore 46 extending through the spherical member or float portion 42.

In this embodiment, the fishing line 36 suspended from the casting rod is threaded through the hole 46 of the spherical float portion 42. A tapered plug 48 inserted in one end of the hole 46 adjustably secures the line therein and provides the hook attached length of fishing line 37 corresponding to the desired fishing depth. The point of line attachment thus provided tends to balance and maintain the axis of the spool 44 substantially horizontal prior to a casting throw. As above, the hook attached length of fishing line 37 previously wrapped around the float attached spool 44 is retained thereon during the casting throw by cooperating centrifugal forces acting on the line attached hook and tending to maintain the spool axis perpendicular or normal to the float attached casting line.

As before, when the combined float and spool 40 strikes the water upon completion of the cast, the relatively dense spool portion 44 causes the spherical float portion 42 to assume the floating position shown in FIGURE 5. The vertical axial position of the submerged knob or spool portion permits the hook attached line portion 37 previously wound and stored thereon during the casting throw to unwind as the hook 38 descends to the desired depth.

In the third form of the invention illustrated in FIGURES 6 and 7, the casting float 50 comprises two cooperating float forming portions or halves 56 and 58. These two float forming portions are sealingly joined at 54 and form a hollow semispherical float portion 52 terminating in an annular fishing line retaining groove 60 and end flange 61. The two float forming halves 56 and 58 each have a central cylindrical flange 57 and 59, respectively, which are sealingly joined and cooperate to provide coaxial central bores of stepped diameters extending diametrically through the hollow float portion 52.

Two closely spaced holes open at 62 and 63 to the central bore of the float member 58. These spaced holes slidably receive opposite legs of a reverse bend 65 formed in the end portion of a wire 64. This wire extends axially through the aligned bores of the cylindrical flanges 57 and 59 and is suitably secured at its distal end to a button or plug 66. The button 66 is slidably mounted in the central bore of the flange 57 and normally projects outwardly of the float portion 56. A spring 68 is compressively interposed between the button 66 and a radial shoulder formed inwardly of the cylindrical flange 57. The spring 68 normally biases the wire 64 so as to maintain the bent wire end portion 65 which threadably receives the fishing line therethrough, in line clamping engagement with the surface of the member 58 intermediate the holes 62 and 63. Adjustment of the line-to-float attachment may be simply and easily effected by depressing the button 66 against the biasing action of the spring 68. Such button depression shifts the bent wire end portion out of line clamping engagement with the outer surface of the float.

As in the previous embodiments, the wire end 65 secures the line to the float 50 at a balance point lying in a plane normal to the common axis of the float portion 52, the groove 60 and end flange 61 and passing substantially through the center of gravity of the float. The hook attached and depth adjusted line portion 37 may thus be wound and retained within the groove 60 by the horizontal disposition of the float prior to casting. During a casting throw, the cooperating centrifugal forces acting on the float and hook tend to maintain the float axis normal to the casting line and assure retention of hook attached line within the float formed groove. Upon water entry at completion of the casting throw the float assumes an initial vertical axial floating position similar to that of the previous embodiment as shown in FIGURE 5. This initial floating position permits the groove stored line to unwind freely over the groove terminating end flange 61. As the baited hook and often weighted line descends to the desired fishing depth, the float normally assumes an inclined floating position similar to that shown in FIGURE 7.

In the modified form of the invention shown in FIGURE 8, the conventional commercially available casting float 70 comprises a hollow float portion 72 formed by two hemispherical portions or halves 76 and 78. As in the previous embodiment, these two float portions, each having a central cylindrical flange 77 and 79, respectively, are sealingly joined at 74 thus providing coaxial central bores of stepped diameters extending through the resultant hollow spherical float member 72.

Two closely spaced holes open at 82 and 83 to the central bore of the float member 78. These spaced holes slidably receive opposite legs of a reverse bend 85 formed in the end portion of a wire 84 extending diametrically of the float through the aligned cylinders 77 and 79. The distal end of the wire 84 is suitably secured to a button or plug 86 slidably mounted within the cylindrical flange 77. A spring 88 is compressively interposed between the button 86 and a radial shoulder formed inwardly of the cylindrical flange 77 and biases the button outwardly of the float portion 76. The bent wire end portion 85 is thus biased to adjustably clamp the fishing line 36 threaded therethrough against the float member 78 between the wire receiving holes 82 and 83. As in the previous embodiment, adjustment of the line-to-float attachment is simply and easily effected by depressing the button 86 thus shifting the bent wire end portion 85 out of line clamping engagement with the outer surface of the float.

In accordance with the invention, a line storing knob or spool 80 similar to that of the first embodiment (FIGURES 1-3) is suitably secured to the outer surface of the float 70 on a radial axis and is so spaced from the point of line attachment as to balance the opposing moments resulting from the disproportion masses of the two float halves and the line securing button and spring. Consequently, the fishing line portion 36 is adjustably secured to the combined float and spool 70 as before at a balance point lying in a plane normal to the axis of the line storing spool and passing substantially through the center of gravity of the combined float.

The hook attached and depth adjusted line portion 37 may thus be wound around and retained on the horizontally disposed spool 80 prior to a casting throw. The centrifugal forces acting on the float and hook through the casting arc of the float 70 cooperate to maintain the spool axis normal to the casting line and thus assure retention of the hook attached line on the float attached line storing spool. When the float assumes its normal in-water floating position shown in FIGURE 8 upon completion of the cast, the spool stored line freely unwinds from the submerged, vertically disposed spool as the hook descends to the desired fishing depth.

From the foregoing description of several illustrative embodiments, it will be seen that the invention provides improved castable floats fully capable of meeting the several stated objectives and advantages. It will be further apparent that various changes and departures might be made in and from the form of the disclosed floats and of the float attached line storing member without departing from the spirit and scope of the invention as defined in the following claims.

I claim:
1. A castable fishing float comprising a hemispherical buoyant member and a spool member of greater density than said hemispherical member associated therewith and adapted to windably receive a hook attached length of fishing line, means for securing the fishing line to the float at the approximate balancing point of the hemispherical member and the spool member whereby the axis of the spool member is maintained substantially perpendicular to the fishing line during casting thereby centrifugally maintaining the hook attached length of fishing line windably stored on the spool member through the arc of the casting throw, the relative buoyancy of the hemispherical and spool members of the float being adapted to move the float to assume a floating position submerging the spool member in a depending substantially vertical position in the water on completion of a cast thereby permitting the stored length of fishing line to unwind freely from the spool member with consequential descent of the fishing hook to a desired fishing depth, the hemispherical member being cup shaped, a centrally disposed rod extending from said member, a centrally perforated plate receiving said rod and secured in fluid tight relation with the cup shaped member, telescoping connecting means mounting said spool member on the rod, and yielding means urging said spool member toward the plate.

2. The invention defined in claim 1 wherein cooperating pin and notch anti-rotate elements are provided between the spool and the hemispherical members.

References Cited by the Examiner
UNITED STATES PATENTS

| 1,918,507 | 7/1933 | Westling | 43—43.11 |
| 2,603,905 | 7/1952 | Brzezinski | 43—43.11 |
| 2,911,754 | 11/1959 | Mills | 43—43.11 |
| 2,915,847 | 12/1959 | Hancock | 43—43.11 |
| 3,106,034 | 10/1963 | Jonassen | 43—43.11 |

FOREIGN PATENTS 98,285   7/1961   Norway.

SAMUEL KOREN, *Primary Examiner.*

ABRAHAM G. STONE, *Examiner.*

R. L. HOLLISTER, *Assistant Examiner.*